United States Patent
Harding et al.

(10) Patent No.: US 12,516,814 B2
(45) Date of Patent: Jan. 6, 2026

(54) COMBUSTOR ASSEMBLY WITH FASTENED COMBUSTOR LINER AND HEAD

(71) Applicant: ROLLS-ROYCE plc, London (GB)

(72) Inventors: Stephen C. Harding, Bristol (GB); Paul A. Hucker, Bristol (GB); Iain Morgan, Braunton (GB)

(73) Assignee: Rolls-Royce plc

( * ) Notice: Subject to any disclaimer, the term of this patent is extended or adjusted under 35 U.S.C. 154(b) by 0 days.

(21) Appl. No.: 18/772,375

(22) Filed: Jul. 15, 2024

(65) Prior Publication Data

US 2025/0052425 A1   Feb. 13, 2025

(30) Foreign Application Priority Data

Aug. 8, 2023  (GB) ..................... 2312110

(51) Int. Cl.
 *F23R 3/00* (2006.01)
 *F23R 3/60* (2006.01)

(52) U.S. Cl.
 CPC ............... *F23R 3/002* (2013.01); *F23R 3/60* (2013.01); *F23R 2900/00017* (2013.01)

(58) Field of Classification Search
 CPC ... F23R 3/002; F23R 2900/00017; F23R 3/60
 See application file for complete search history.

(56) References Cited

U.S. PATENT DOCUMENTS

| | | |
|---|---|---|
| 2007/0180809 A1 | 8/2007 | Bessagnet et al. |
| 2010/0275606 A1* | 11/2010 | Holcomb ................. F23R 3/42 60/752 |
| 2012/0073259 A1 | 3/2012 | Hernandez et al. |
| 2013/0042627 A1* | 2/2013 | Gerendas ............. F23M 20/005 60/725 |
| 2013/0152591 A1 | 6/2013 | Dery et al. |
| 2017/0059167 A1* | 3/2017 | Bloom ..................... F23R 3/007 |
| 2017/0187889 A1 | 6/2017 | Igarashi |
| 2017/0248316 A1* | 8/2017 | Hannwacker ............ F23R 3/60 |
| 2018/0051880 A1* | 2/2018 | Stieg ....................... F23R 3/007 |
| 2018/0187889 A1* | 7/2018 | Mulcaire ................. F23R 3/44 |
| 2020/0284199 A1* | 9/2020 | Morenko ................. F23R 3/50 |

(Continued)

FOREIGN PATENT DOCUMENTS

| | | |
|---|---|---|
| CN | 111561713 A | 8/2020 |
| DE | 102017201349 A1 | 8/2018 |
| EP | 3054218 A1 | 8/2016 |

(Continued)

OTHER PUBLICATIONS

European search report dated Nov. 5, 2024, issued in EP Patent Application No. 24187014.6.

(Continued)

*Primary Examiner* — Thomas P Burke
(74) *Attorney, Agent, or Firm* — Barnes & Thornburg

(57) ABSTRACT

The present disclosure relates to a combustor assembly for a gas turbine engine. The combustor assembly comprises a combustor liner, a combustor head, a cowl and a fastener. The combustor liner and the cowl define a cavity. The combustor liner has an integral lug that extends into the cavity from a wall of the combustor liner. The fastener extends into the combustor liner lug to fasten the combustor head to the combustor liner.

18 Claims, 8 Drawing Sheets

(56) References Cited

U.S. PATENT DOCUMENTS

2022/0082055 A1    3/2022  Hucker et al.
2023/0313992 A1*  10/2023  Chiranthan .............. F23R 3/60
                                                     60/752

FOREIGN PATENT DOCUMENTS

EP    3211321 A1   8/2017
FR    2998039 A1   5/2014
GB    2263733 A    8/1993

OTHER PUBLICATIONS

Database WPI Week 2020072 AN 2020-83698E, Thomson Scientific, Aug. 21, 2020.
Great Britain search report dated Feb. 1, 2024, issued in Great Britain patent application No. 2312110.6.

* cited by examiner

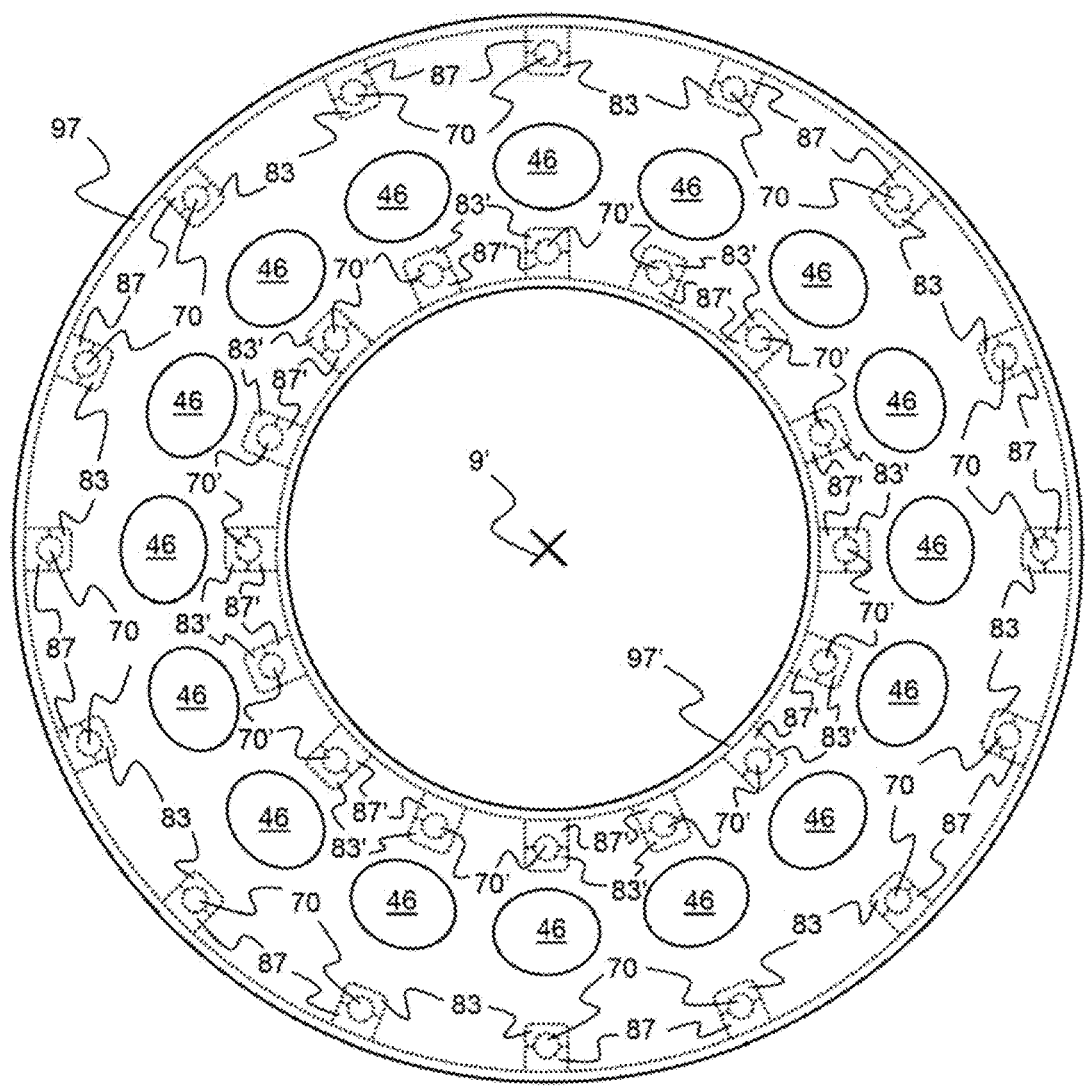
FIG. 6

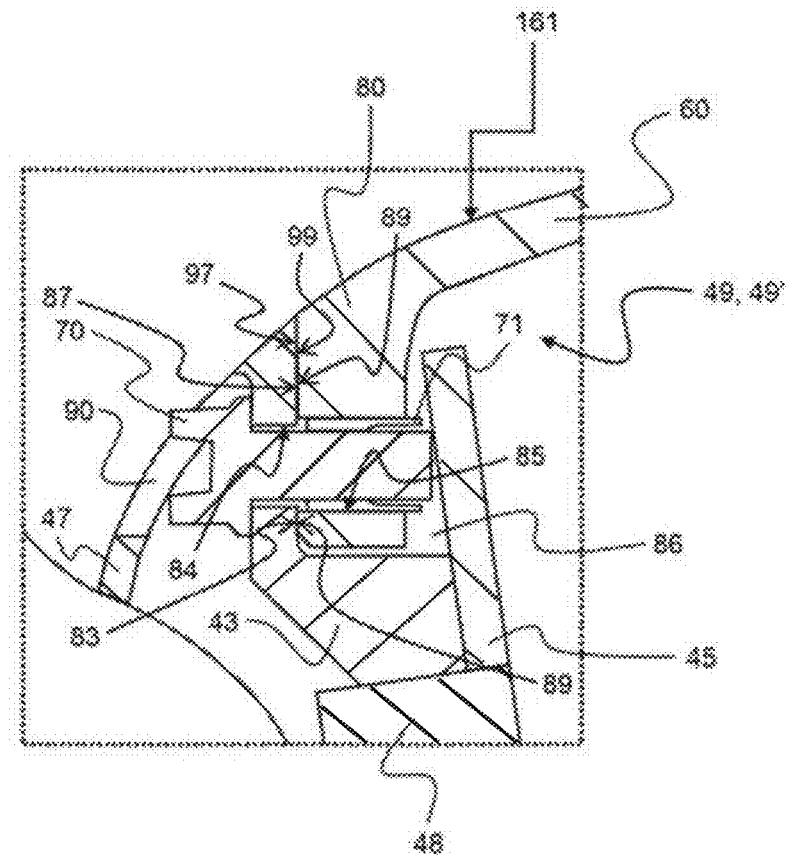
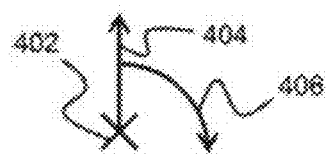
FIG. 7

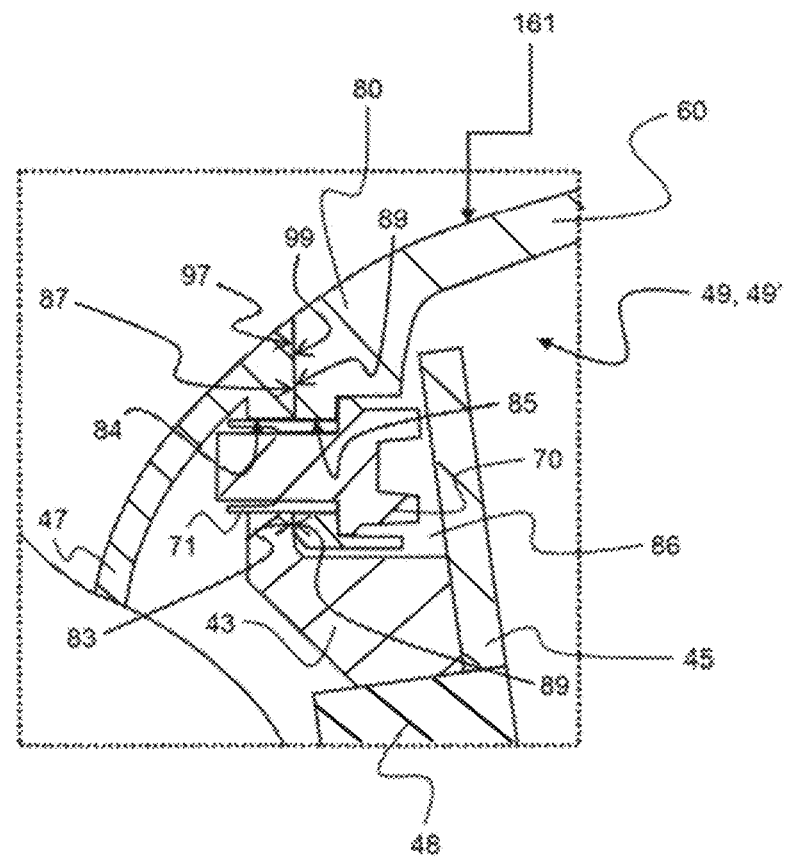
FIG. 8

COMBUSTOR ASSEMBLY WITH FASTENED COMBUSTOR LINER AND HEAD

CROSS-REFERENCE TO RELATED APPLICATIONS

This specification is based upon and claims the benefit of priority from United Kingdom Patent Application No. 2312110.6 filed on Aug. 8, 2023, the entire contents of which are hereby incorporated herein by reference.

BACKGROUND

Technical Field

The present disclosure concerns a combustor assembly for a gas turbine engine, the combustor assembly comprising a combustor liner, a combustor head, a cowl and at least one fastener. The present disclosure also concerns a gas turbine engine comprising such a combustor assembly.

Description of the Related Art

A conventional combustor configuration includes a hoop-continuous combustor liner welded to a head structure at the front of the combustor and welded to a hoop-continuous support arm at the rear of the combustor (for a rear mounted combustor). Otherwise, the combustor liner may be welded to a hoop continuous turbine interface ring at the rear (for a front mounted). A combustor in which different sub-components are fastened together, as opposed to welded, may be referred to as a combustor assembly or an assembled combustor. Assembled combustors/combustor assemblies enable the use of different materials and manufacturing processes which, in turn, allows the introduction of higher performance features to the combustor. Typically, a combustor of a gas turbine engine is subject to ultimate load cases during a compressor surge event or a combustor flame-out event. Mechanical buckling of the combustor may be a concern during such load cases.

US 2022/0082055 A1 describes a combustion chamber comprising a plurality of circumferentially arranged cassette segments coupled to a combustor head at one end and a wall section at the other end. The combustor head has an annular tongue structure on a mating surface. The tongue structure engages with a groove portion present in each of the cassettes so that when assembled the groove portions in each of the plurality of cassette segments forms a substantially continuous groove. EP 3054218 A1 describes a combustion chamber comprising an upstream ring structure, a downstream ring structure and a plurality of circumferentially arranged combustor liner segments. The combustor liner segments have a stiff frame structure which carries the structural loads, the thermal loads, surge loads and flameout loads, and the frame structure distributes loads into adjacent components.

However, each of these prior-art arrangements have associated disadvantages. It is desired to provide an improved combustor assembly which is able to adequately resist mechanical buckling in a variety of load cases whilst providing good overall performance characteristics.

SUMMARY

According to a first aspect of the present disclosure, there is provided a combustor assembly for a gas turbine engine, the combustor assembly comprising a combustor liner, a combustor head, a cowl and a fastener, wherein the combustor liner and the cowl define a cavity; the combustor liner has an integral lug that extends into the cavity from a wall of the combustor liner; and the fastener extends into the combustor liner lug to fasten the combustor head to the combustor liner.

The fastener may extend through the combustor liner lug to fasten the combustor head to the combustor liner. The lug may diverge from a profile of the wall of the combustor liner. The combustor head may be configured to receive and support a fuel injector. The fastener may be a bolt, or a rivet. It may be that the combustor head and the cowl each form part of an integral head structure.

The fastener may extend through the combustor liner lug to fasten both the combustor head and the cowl to the combustor liner.

It may be that at least 70% of the volume of the fastener is located within an external profile defined by the cowl and the combustor liner. It may be that at least 80%, at least 90%, or at least 95% of the volume of the fastener is located within the external profile. The fastener may be entirely located within the external profile.

The combustor assembly may annularly extend around a centreline. The fastener may be elongate along a length direction parallel with the centreline.

It may be that the combustor head, the cowl and the combustor liner lug each define a respective mating face. The mating face of the combustor liner lug may abut the mating face of the combustor head or the mating face of the cowl. It may also be that the mating face of the combustor liner lug abuts the mating face of the combustor head and the mating face of the cowl.

It may be that: the combustor assembly annularly extends around a centreline; the mating face of the combustor liner lug lies on a mating plane; and a normal to the mating plane is substantially parallel to the centreline.

The mating face of the cowl may lie on the mating plane and/or the mating face of the combustor head may lie on the mating plane.

It may be that: a head aperture is formed between the mating faces of the cowl and the combustor head; a lug aperture is formed in the mating face of the combustor liner lug; and the fastener extends into both the head aperture and the lug aperture.

It may be that: the combustor head and the cowl together form a head structure; the combustor liner lug extends into a corresponding recess defined by the head structure; and the head aperture opens into the recess defined by the head structure.

The combustor assembly may annularly extend around a centreline. The cowl and the combustor liner may each define a respective sealing face. The sealing face of the combustor liner may abut the sealing face of the cowl throughout the annular extent of the combustor assembly. Each sealing face may lie on a sealing plane; and a normal to the sealing plane may be substantially parallel with the centreline.

The fastener may define a male thread. The combustor head and the cowl may be fastened with respect to the combustor liner by means of the male thread engaging a female thread.

The female thread may be defined by or located inside the combustor liner lug. The female thread may be defined by a nut located outside of the combustor liner lug. The fastener may be configured to be withdrawn from the female thread through an access hole formed in the cowl.

The female thread may be defined by or located inside the head aperture. The female thread may be defined by a nut located outside of the head aperture.

It may be that the fastener is one of a plurality of fasteners and the combustor liner lug is one of a plurality of combustor liner lugs. Each combustor liner lug may extend into the cavity from the wall of the combustor liner. Each fastener may extend into a respective combustor liner lug to fasten the combustor head to the combustor liner.

It may be that each fastener is elongate along a respective length direction. The combustor assembly may annularly extend around a centreline, and the length direction of each fastener may be substantially parallel with the centreline.

According to a second aspect of the present disclosure, there is provided a gas turbine engine comprising a combustor assembly in accordance with the first aspect.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only bye the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38, 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e., the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e., the portion radially outside any platform.

The radius of the fan may be measured between the engine centreline and the tip of a fan blade at its leading edge. The fan diameter (which may simply be twice the radius of the fan) may be greater than (or on the order of) any of: 210 cm, 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 cm (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e., the values may form upper or lower bounds), for example in the range of from 210 cm to 240 cm, or 250 cm to 280 cm, or 330 320 cm to 380 cm.

The rotational speed of the fan may vary in use. Generally, the rotational speed is lower for fans with a higher diameter. Purely by way of non-limitative example, the rotational speed of the fan at cruise conditions may be less than 2600 rpm, for example less than 2500 rpm, for example less than 2300 rpm. Purely by way of further non-limitative example, the rotational speed of the fan at cruise conditions for an engine having a fan diameter in the range of from 220 210 cm to 300 cm (for example 240 cm to 280 cm or 250 cm to 270 cm) may be in the range of from 1700 rpm to 2500 2600 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity Utip. The work done by the fan blades 13 on the flow results in an enthalpy rise dH of the flow. A fan tip loading may be defined as $dH/Utip2$, where dH is the enthalpy rise (for example the 1-D average enthalpy rise) across the fan and Utip is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all values being dimensionless). The fan tip loading may be in an inclusive range bounded by any two of the values in the previous sentence (i.e., the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest-pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 Nkg-1 s, 105 Nkg-1 s, 100 Nkg-1 s, 95 Nkg-1 s, 90 Nkg-1 s, 85 Nkg-1 s or 80 Nkg-1 s. The specific thrust may be in an inclusive range bounded by any two of the values in the previous sentence (i.e., the values may form upper or lower bounds), for example in the range of from 80 Nkg-1 s to 100 Nkg-1 s, or 85 Nkg-1 s to 95 Nkg-1 s. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 130 kN, 135 kN, 140 kN, 145 kN, 150 kN, 155 kN, 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 155 kN to 170 kN, 330 kN to 420 kN, for example or 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high-pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1520K, 1530K, 1540K, 1550K, 1600K or 1650K. The TET at cruise may be in an inclusive range bounded by any two of the values in the previous sentence (i.e., the values may form upper or lower bounds), for example 1530K to 1600K. The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e., the values may form upper or lower bounds), for example in the range of from 1800K to 1950K, or 1900K to 2000K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example, at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance-between top of climb and start of descent). Cruise conditions thus define an operating point of the gas turbine engine that provides a thrust that would ensure steady state operation (i.e., maintaining a constant altitude and constant Mach Number) at mid-cruise of an aircraft to which it is designed to be attached, taking into account the number of engines provided to that aircraft. For example, where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft-steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to a forward Mach number of 0.8 and standard atmospheric conditions (according to the International Standard Atmosphere) at an altitude of 35000 ft (10668 m). At such cruise conditions, an operating point of the engine provides a known required net thrust level. The known required net thrust level is, of course, dependent on the engine and its intended application and may be, (for example, a value in the range of from 230 kN to 4035 kN.) at a forward Mach number of 0.8 and standard atmospheric conditions (according to the International Standard Atmosphere) at an altitude of 38000 ft (11582 m).

Purely by way of further example, the cruise conditions may correspond to a forward Mach number of 0.85 and standard atmospheric conditions (according to the International Standard Atmosphere) at an altitude of 38000 ft (11582 m). At such cruise conditions, the engine may provide a known required net thrust level. The known required net thrust level is, of course, dependent on the engine and its intended application and may be, for example, a value in the range of from 35 kN to 65 kN. an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only with reference to the accompanying drawings, which are purely schematic and not to scale, and in which:

FIG. 6 is a partially cut-away view of the annular extent of the example combustor apparatus of FIG. 4 in the direction indicated by B;

FIG. 7 is a detail cross-sectional view of the example combustor assembly of FIG. 4 in the region indicated by C;

FIG. 8 is a detail cross-sectional view of another example combustor assembly in a region corresponding to that indicated by C on FIG. 4.

DETAILED DESCRIPTION

Figure 1:
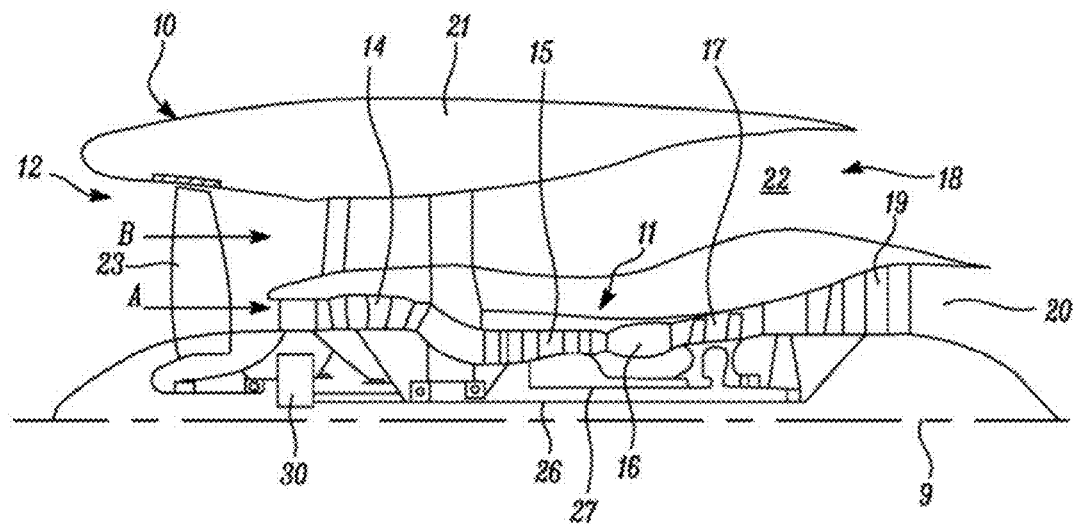
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low-pressure compressor 14, a high-pressure compressor 15, combustion equipment 16, a high-pressure turbine 17, a low-pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low-pressure turbine 19 via a shaft 26 and an epicyclic gearbox 30.

In use, the core airflow A is accelerated and compressed by the low-pressure compressor 14 and directed into the high-pressure compressor 15 where further compression takes place. The compressed air exhausted from the high-pressure compressor 15 is directed into the combustion equipment 16 where it is mixed with fuel and the mixture is combusted. The resultant hot combustion products then expand through, and thereby drive, the high pressure and low-pressure turbines 17, 19 before being exhausted through the nozzle 20 to provide some propulsive thrust. The high-pressure turbine 17 drives the high-pressure compressor 15 by a suitable interconnecting shaft 27. The fan 23 generally provides the majority of the propulsive thrust. The epicyclic gearbox 30 is a reduction gearbox.

Figure 2:
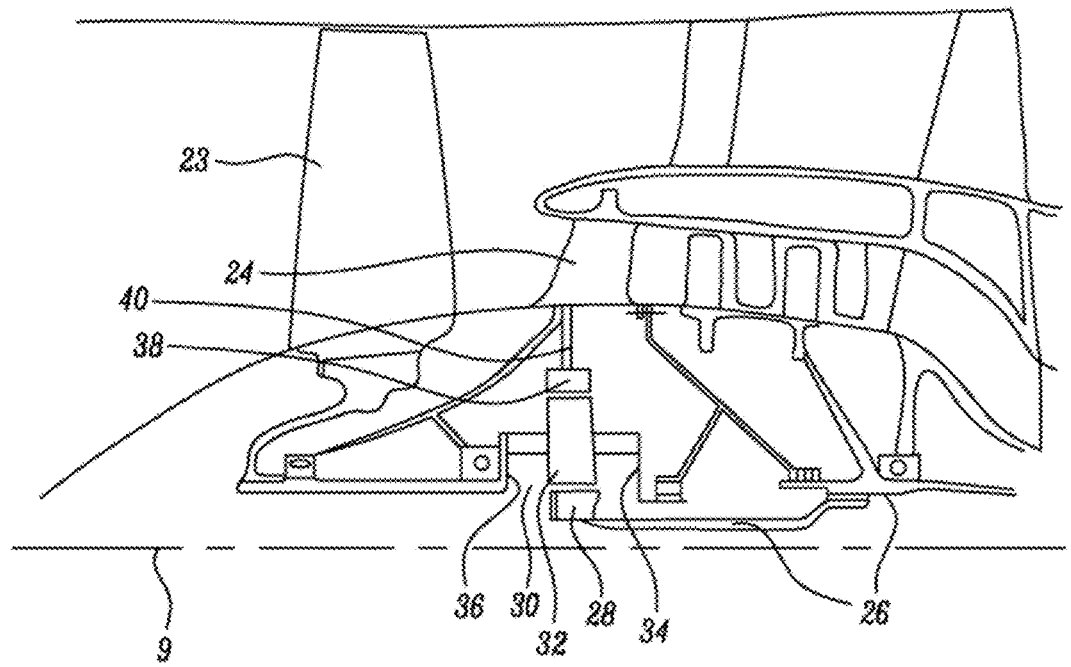
FIG. 2 is a close-up sectional side view of an upstream portion of a gas turbine engine.

An exemplary arrangement for a geared fan gas turbine engine 10 is shown in FIG. 2. The low-pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
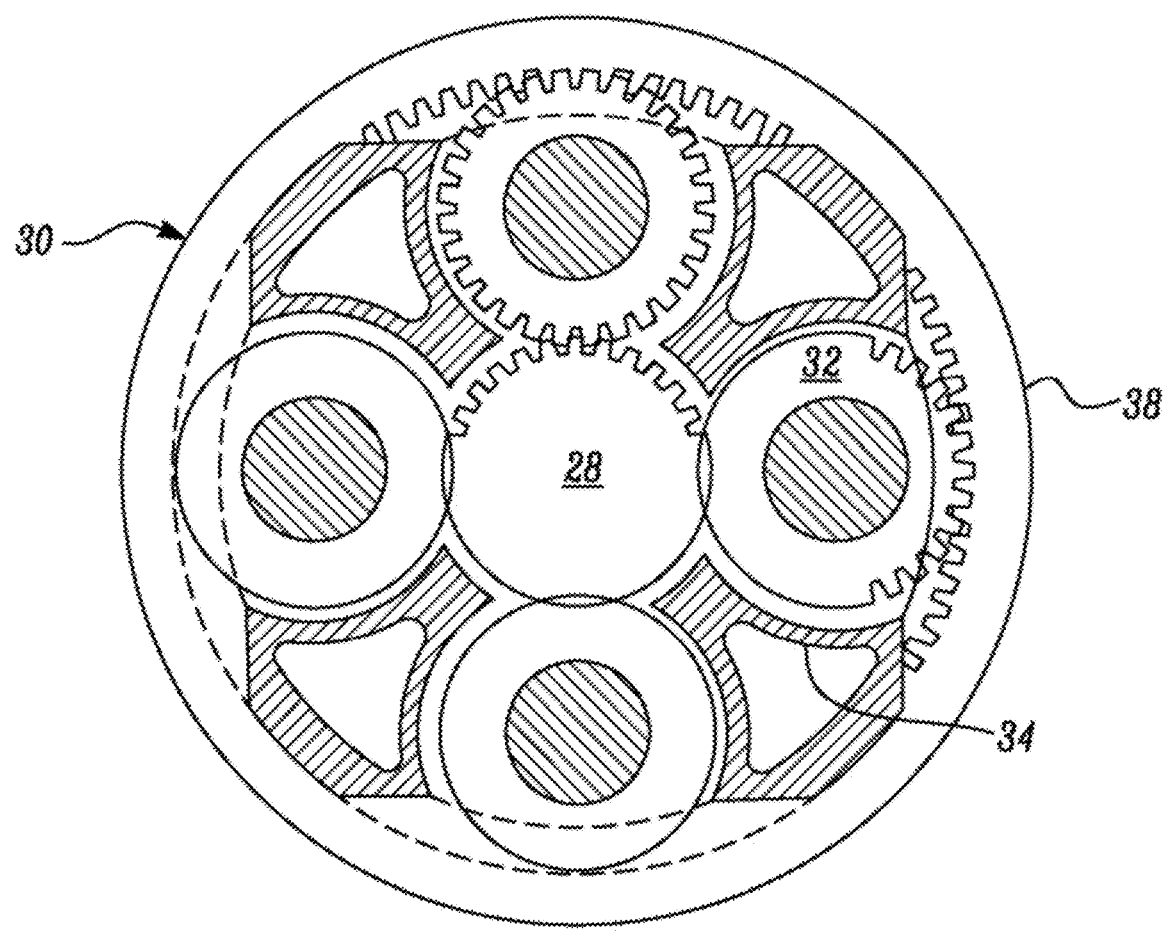
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed disclosure. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

The combustion equipment 16 will now be described in further detail with reference to FIGS. 4 to 8. For ease of reference, a coordinate system is shown on each of FIGS. 4 to 8. The coordinate system specifies an axial direction 402, a radial direction 404 and a circumferential direction 406 of the combustor assembly 160. The coordinate system is defined such that, when the combustor assembly 160 is incorporated within the gas turbine engine 10, the axial direction 402 is parallel to the axial direction of the gas turbine engine (and therefore the rotational axis 9), the radial direction 404 is parallel to a radial direction of the gas turbine engine 10 and the circumferential direction 406 corresponds to the circumferential direction of the gas turbine engine 10.

Figure 4:
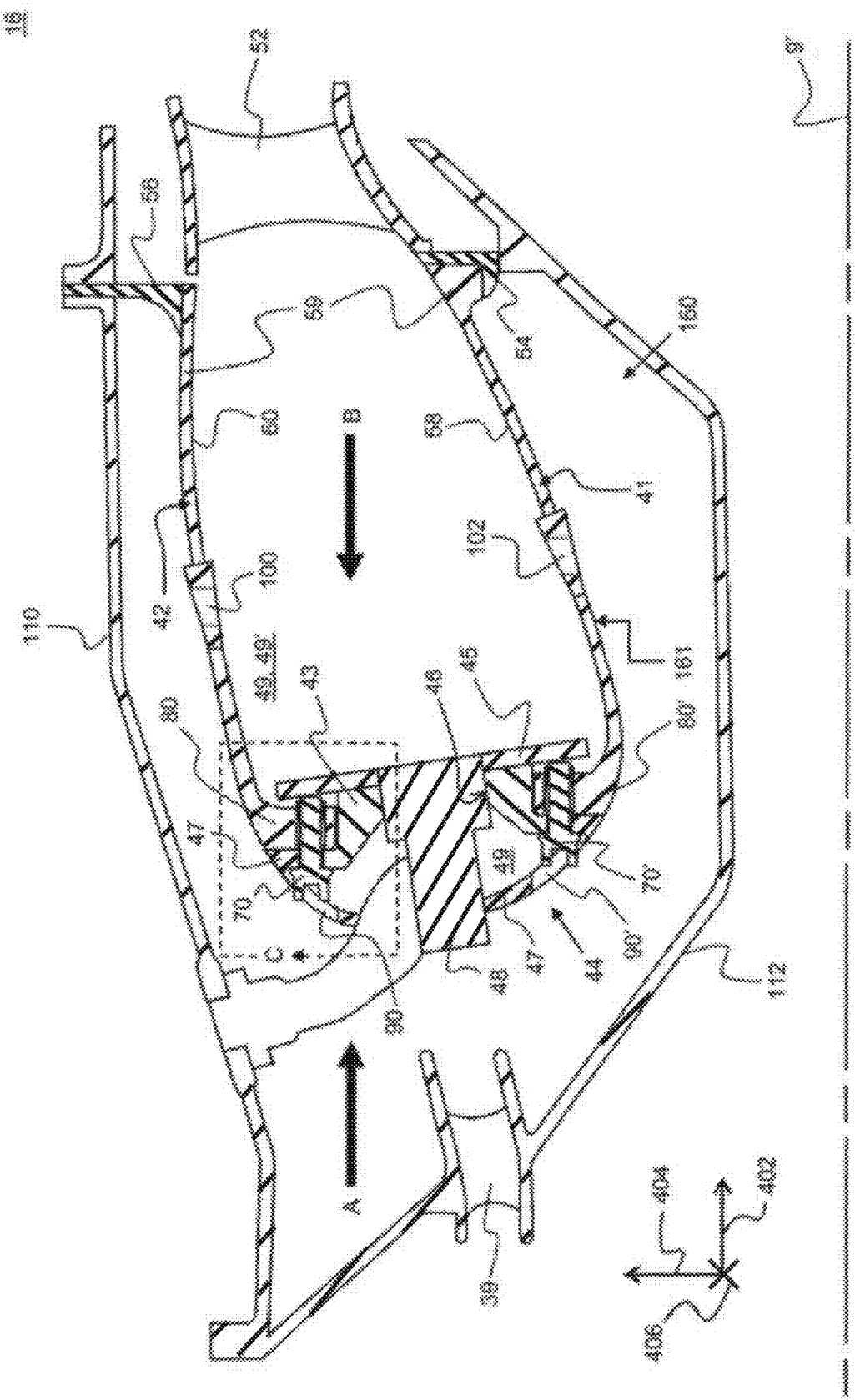
FIG. 4 is a cross-sectional view of example combustion equipment comprising an example combustor assembly.

FIG. 4 is a more detailed cross-sectional view of the combustion equipment 16 shown by FIGS. 1 and 2. The combustion equipment 16 annularly extends around a centreline 9'. The combustion equipment 16 includes a combustor assembly 160 comprising a combustor liner 59, a head structure 44 and a fastener 70, 70'. Compressor outlet guide vanes 39 and turbine nozzle guide vanes 52 are shown by FIG. 4 in positional relation to the combustion equipment 16. In the examples of FIGS. 4 to 8, the fastener 70, 70' is one of a plurality of such fasteners 70, 70'. However, it should be appreciated that the combustor assembly 160 may comprise only one fastener 70, 70' as described herein.

The combustor liner 59 includes a radially inner annular wall structure 41 and a radially outer annular wall structure 42. The upstream end of the radially inner annular wall structure 41 is secured to the head structure 44 and the upstream end of the radially outer annular wall structure 42 is secured to the head structure 44. In the examples of FIGS. 4 to 8, the head structure 44 comprises a combustor head 43 (which may also be referred to as a meterpanel 43), a heat shield 45 and a cowl 47. The cowl 47 is positioned axially upstream of and secured to the combustor head 43. The combustor liner 59 and the cowl 47 together define a cavity 49 within the combustor assembly 160. The combustor liner 59 and the head structure 44 (or at least the combustor head 43 of the head structure 44) define a combustion chamber 49' within the combustor assembly 160. The combustion chamber 49' is a part of the cavity 49 which is generally downstream of the head structure 44. The combustor assembly 160 annularly extends around the centreline 9', such that the cavity 49 defined by the combustor liner 59 and the cowl 47 is an annular cavity 49. The heat shield 45 is positioned axially downstream of and secured to the combustor head 43 to protect the combustor head 43 from combustion gases in the combustion chamber 49'. The heat shield 45 is entirely located within the cavity 49 defined by the combustor liner 59 and the cowl 47. Also in the examples of FIGS. 4 to 8, the plurality of fasteners 70, 70' includes at least one radially inner fastener 70' and at least one radially outer fastener 70.

The combustion equipment 16 is provided with a plurality of fuel injectors 48, arranged to supply fuel into the combustion chamber 49' during operation of the gas turbine engine 10. The combustor head 43 has a plurality of circumferentially spaced apertures 46, with each aperture 46 receiving and accommodating a respective one of the plurality of fuel injectors 48. The heat shield 45 and the cowl 47 also each have a plurality of circumferentially spaced apertures and each aperture in the heat shield 45 and the cowl 47 is aligned with a corresponding aperture 46 in the combustor head 43.

A plurality of circumferentially distributed compressor outlet guide vanes 39 are positioned axially upstream of the combustion equipment 16 and are arranged to direct the compressed air from the high-pressure compressor 15 into the annular combustion equipment 16. The airflow between the compressor outlet guide vanes 39 and the turbine nozzle guide vanes 52 within the annular combustion equipment 16 may be referred to as the combustor annulus airflow. In particular, a first portion of the combustor annulus airflow is directed in use into the combustion chamber 49' though at least one air passageway formed in the fuel injector 48, and a second portion of the combustor annulus airflow is directed around the combustor assembly 160. A plurality of circumferentially distributed turbine nozzle guide vanes 52 are positioned axially downstream of the combustion equipment 16 and are arranged to direct the hot gases from the annular combustion equipment 16 into the high-pressure turbine 17.

In this example, the radially outer annular wall structure 42 comprises at least one radially outer mixing port 100 and the radially inner wall structure 41 comprises at least one radially inner mixing port 102. Each mixing port 100, 102 is configured to facilitate and promote influx of the second portion of the combustor annulus airflow into the combustion chamber 49' in which it mixes with the first portion of the combustor annulus airflow for improved combustion of gases (e.g., fuel and air) within the combustion chamber 49'.

However, it will be appreciated that in other examples, the radially outer annular wall structure 42 may not comprise a radially outer mixing port 100 and/or the radially inner wall structure 41 may not comprise a radially inner mixing port 102.

The annular combustion equipment 16 is positioned radially between a radially outer combustion equipment casing 110 and a radially inner combustion equipment casing 112. The region between the radially outer combustion equipment casing 110 and the combustion equipment 16 may be referred to as an outer annulus, while the region between the radially inner combustion equipment casing 112 and the combustion equipment 16 may be referred to as an inner annulus. The upstream end of the radially inner combustion equipment casing 112 is removably secured to the upstream end of the radially outer combustion equipment casing 110. For this purpose, a flange (not shown) at the upstream end of the radially inner combustion equipment casing 112 may be removably secured to a flange (not shown) at the upstream end of the radially outer combustion equipment casing 110 by suitable fasteners, e.g., bolts or rivets, passing through the flanges. The downstream end of the radially inner combustion equipment casing 112 is removably secured to the radially inner ends of the turbine nozzle guide vanes 52. To this end, flanges (not shown) on the turbine nozzle guide vanes 52 may be removably secured to a flange (not shown) at the downstream end the radially inner combustion equipment casing 112 by suitable fasteners passing through the flanges.

A radially inner downstream ring structure 54 is mounted on the radially inner combustion equipment casing 112 and a radially outer downstream ring structure 56 is mounted on the radially outer combustion equipment casing 110. In this example, the radially inner annular wall structure 41 of the annular combustion equipment 16 and the radially outer annular wall structure 42 of the annular combustion equipment 16 comprise a plurality of circumferentially distributed combustor liner segments 58 and 60, respectively. It is to be noted that the combustor liner segments 58, 60 extend the full axial, longitudinal, length of the annular combustion equipment 16. The combustor liner segments 58, 60 may be incorporated and/or affixed within the combustor assembly 160 using tongue and groove structures as described in US 2022/0082055 A1 with respect to FIGS. 10, 11 and 12 thereof.

The combustor liner 59 includes at least one integral lug 80, 80'. The or each integral lug extends away from a wall (e.g., the radially inner wall structure 41 or the radially outer wall structure 42) of the combustor liner 59 and into the cavity 49 defined by the cowl 47 and the combustor liner 59. In the example of FIG. 4, the plurality of integral lugs 80 includes at least one radially inner integral lug 80' and at least one radially outer integral lug 80, with each fastener 70, 70' extending through a respective integral lug 80, 80' to fasten the head structure 44 (e.g., at least the combustor head 43 or both the combustor head 43 and the cowl 47) to the combustor liner 59. The radially outer lug 80 extends from the radially outer wall structure 42 into the cavity 49 (e.g., extending inwardly from a profile of the radially outer wall structure) and the radially outer fastener 70 extends into (e.g., though, as in the example of FIGS. 4 to 7) the radially outer lug 80 to fasten the head structure 44 to the combustor liner 59. The radially inner lug 80' extends from the radially inner wall structure 41 into the cavity 49 (e.g., extending inwardly from a profile of the radially inner wall structure 41) and the radially inner fastener extends through the radially inner lug 80' to fasten the head structure 44 to the combustor liner 59.

In the examples of FIGS. 4 to 8, the combustor head 43 and the cowl 47 are not integral components and are instead fastened to one another (e.g., with respect to one another) by the or each fastener 70, 70'. Nevertheless, in some examples, a variant combustor head 43 and cowl 47 may be integral with one another and hence form an integral head structure 44.

Figure 5:
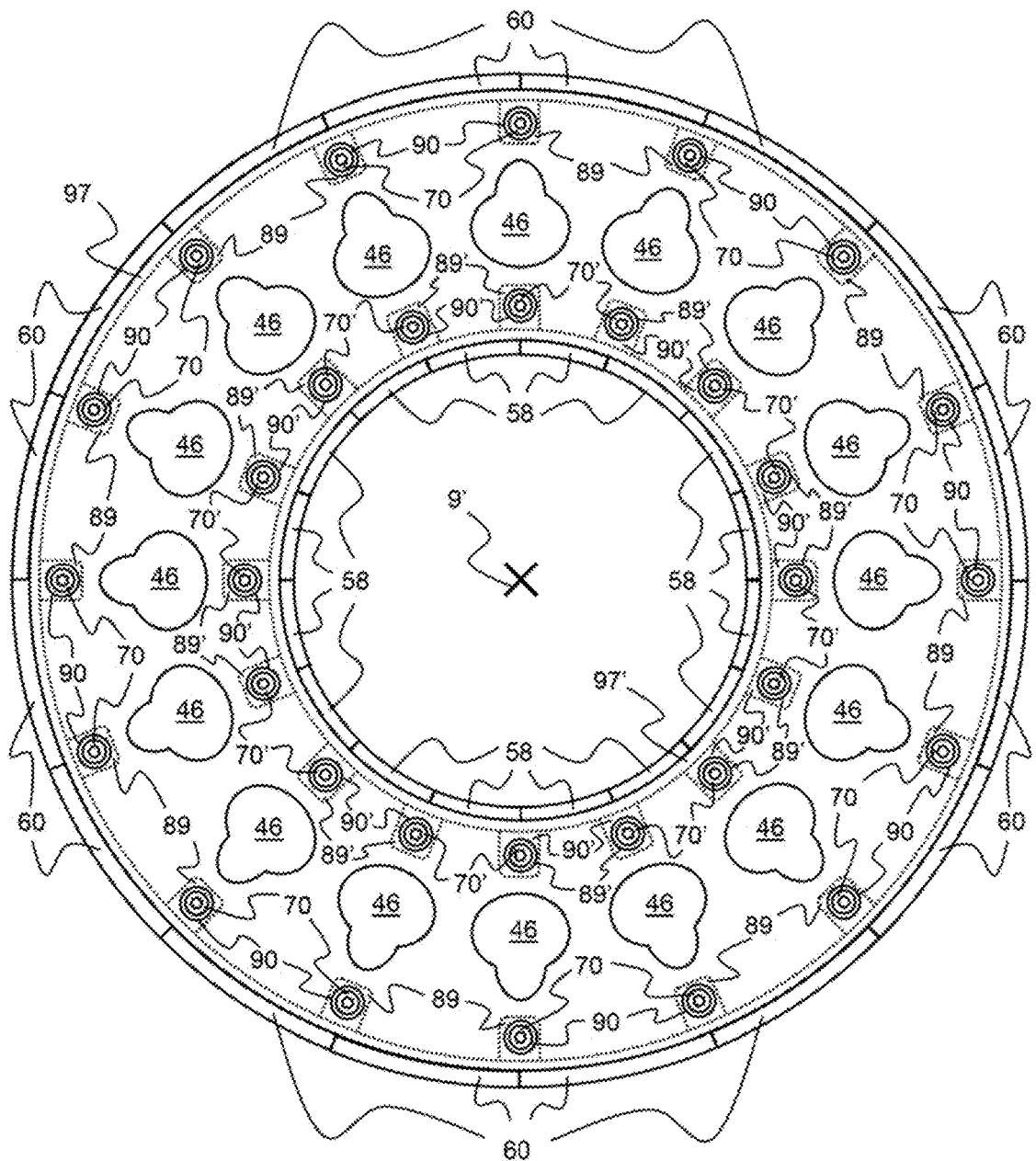
FIG. 5 is a partially cut-away view of an annular extent of the example combustor assembly of FIG. 4 in the direction indicated by A.

FIG. 5 shows a partially cut-away view of an annular extent of the example combustor assembly 160 around the centreline 9' in the direction indicated by A on FIG. 4, with like reference signs indicating common features. The side of the head structure 44 viewable in the direction indicated by A in FIG. 4 may be referred to as a cold side of the head structure 44. FIG. 6 shows a partially cut-away view of the annular extent of the example combustor assembly around the centreline 9' in the direction indicated by B on FIG. 4, with like reference signs denoting common features. The side of the head structure 44 viewable in the direction indicated by B may be referred to as a hot side of the head structure 44. FIG. 7 shows a detail cross-sectional view of the example combustor assembly 106 in the region indicated by C on FIG. 4.

The circumferential arrangement of combustor liner segments 58 and 60 of the annular combustion equipment 16 is best shown in FIG. 5. In this example there are sixteen radially inner combustor liner segments 58 and sixteen radially outer combustor liner segments 60, with each combustor liner segment 58 and 60 extending through an angle of 22.5°. Other suitable numbers of combustor liner segments 58 and 60 may be used, e.g. two, three, four, five, six, eight, ten, twelve, fourteen, eighteen or twenty, and the number of combustor liner segments 58 may be the same as or different to the number of combustor liner segments 60. In this example, each of the combustor liner segments extends through the same angle. However, it is also possible to arrange the combustor liner segments to extend through different angles. Further features of FIG. 5 will be discussed in further detail below.

As can be seen in each of FIGS. 4 to 7, each lug 80, 80' diverges from a profile of the respective wall 41, 42 of the combustor liner 59. In other words, the combustor liner 59 comprises a locally increased radial thickness at the location of each lug 80, 80' to project into the cavity 49. In this example, each lug 80, 80' has a limited extent along the axial direction 402 (as best shown by FIGS. 4 and 7) and a limited extent along the circumferential direction 406, and therefore also has a limited extent around the centreline 9' (as best shown by FIGS. 5 and 6, by reference to the locations of the fasteners 70, 70' which correspond to the lugs). In addition, each lug 80, 80' extends into and generally conforms to the shape of a corresponding recess 86 defined by the head structure 44 (as best shown by FIG. 7). The lugs 80, 80' and the recesses 86 thereby cooperate to radially and circumferentially align the head structure 44 and the combustor liner 59 for effective fastening by the fasteners 70, 70'. Like the lugs 80, 80', each recess 86 has a limited extent along the axial direction 402 and a limited extend along the circumferential direction 406, and therefore a limited extent around the centreline 9'. In other examples, the combustor liner 59 can include only one radially outer integral lug 80 and only one radially inner integral lug 80', In such examples, each lug 80, 80' has a limited extent along the axial direction 402 (like that shown by FIGS. 4 and 7) but extends around the annular extent of the combustor assembly 106 to form a continuous annular integral lug (a flange).

As best shown in FIGS. 4 and 7, a majority of a volume of each fastener 70, 70' is located within an external profile 161 defined by the cowl 47 and the combustor liner 59 as assembled. In the example of FIGS. 4 and 7, more than 70% of the volume of each fastener 70, 70' is located within the external profile 161. In various examples in accordance with the present disclosure, more than 80%, more than 90%, or more than 95% of the volume of each fastener 70, 70' may be located within the external profile 161. Further, in some examples in accordance with the present disclosure, 100% of the volume of each fastener 70, 70' may be located within the external profile 161 such that each fastener 70, 70' is entirely located within the external profile 161.

In a previously considered combustor assembly, the lugs and fasteners joining the combustor liner to the head structure were found to introduce (e.g., instigate) aerodynamic wakes into combustor annulus flow within the outer and inner annuli. These aerodynamic wakes are associated with (e.g., may cause) changes in the dynamic pressure around the mixing ports downstream of the lugs and fasteners, and so may result in reduced air influx into the combustion chamber through the mixing ports. This may subsequently adversely affect the mixing of combustion gases within the combustion chamber. Moreover, this effect may vary circumferentially between mixing ports with and without proximal upstream lugs and fasteners, resulting in variation in combustor annulus airflow exit temperature profile into the turbine nozzle guide vanes 52 and/or an undesirable effect on emissions from the combustion assembly 106. The arrangement of a combustor assembly 160 in accordance with the present disclosure provides improved overall performance characteristics to the combustion equipment 16 by reducing the likelihood or influence of significant aerodynamic wakes being introduced into the combustor annulus flow within the inner and outer annuli (and hence increasing air influx into the combustion chamber 49' through the mixing ports) while being able to adequately resist mechanical buckling in a variety of load cases.

As can be seen from each of FIGS. 6 and 7, the combustor head 43 defines a plurality of combustor head mating faces 83, 83', the cowl defines a plurality of cowl mating faces 87, 87', and each lug 80, 80' defines a lug mating face 89, 89' (see FIG. 5). The lug mating faces 89, 89' are shown using dotted lines in FIG. 5, whereas the combustor head mating faces 83, 83' and the cowl mating faces 87, 87' are shown using dotted lines in FIG. 6. Because the combustor head 43 and the cowl 47 are not integral components in the example of FIGS. 4 to 8, each combustor head mating face 83, 83' and the respective cowl mating face 87, 87' are shown as separate regions in FIG. 6 and a head aperture 84 is formed between the mating faces 83, 83', 87, 87' of the cowl 47 and the combustor head 43 (as best shown in FIG. 7). The head aperture 84 opens into the corresponding recess 86 defined by the head structure 44. Each mating face 83, 83', 87, 87', 89, 89' has a generally planar form. Specifically, each mating face 83, 83', 87, 87', 89, 89' may be planar and may lie on a mating plane having a normal which is substantially parallel with the centreline 9'. For this reason, each mating face may be referred to as an axial mating face.

In examples in which the combustor head 43 and the cowl 47 form an integral head structure, each combustor head mating face 83, 83' and the respective cowl mating face 87, 87' may together form a unified head structure mating face, and so the head aperture 84 may be formed through the unified head structure mating face (corresponding to the mating faces 83, 83', 87, 87' of the cowl 47 and the combustor head 43 described above).

In the example combustor assembly 106 of FIGS. 4 to 8, each lug mating face 89, 89' abuts a corresponding combustor head mating face 83, 83' and a corresponding cowl mating face 87, 87'. A lug aperture 85 is formed within each combustor liner lug 80, 80'. Each lug aperture 85 aligns with a corresponding head aperture 84 as described above, and one of the fasteners 70, 70' extends into (e.g., through) each lug aperture 85 and the corresponding head aperture 84 to fasten both the combustor head 43 and the cowl 47 to (e.g., with respect to) the combustor liner 59. As best seen in FIG. 7, each fastener 70, 70' is elongate along a length direction which is parallel to the centreline 9'. Accordingly, a midline of each aperture 85, 84 is also parallel to the centreline 9'.

Further, the cowl 47 defines a radially outer cowl sealing face 97 and a radially inner cowl sealing face 97' (best shown in FIGS. 5-7), each of which extend around the annular extent of the combustor assembly 106 (as best shown in FIGS. 5 and 6). The combustor liner 59 defines a corresponding radially outer combustor liner sealing face 99 and a corresponding radially inner combustor liner sealing face 99, each of which also extend around the annular extent of the combustor assembly 106 and abuts the opposing cowl sealing face 97, 97' throughout the annular extent of the combustor assembly 106, to seal the cavity 49 proximal to the heat shield 45 and the fuel injector 48. The radial extent of the opposing sealing faces may be considered to be the extent to which they are radially coextensive for abutment. Both sealing faces 97, 99 have a generally planar form. Moreover, the sealing faces 97, 97', 99, 99' are generally planar and lie on a sealing plane having a normal which is substantially parallel with the centreline 9'. Accordingly, each sealing face may be referred to as an axial sealing face.

Each fastener 70, 70' may be, for example, a bolt or a rivet. Specifically, each fastener 70, 70' may be a bolt defining a male thread, and may be configured to fasten the combustor head 43 and the cowl 47 to (e.g., with respect to) the combustor liner 59 by means of the male thread engaging a female thread. In the example of FIGS. 4 to 7, the male thread of each fastener 70, 70' engages a female thread which is defined by an insert 71 located inside the respective lug aperture 85 to provide a spigot-type fit, as best shown by FIG. 7. In further examples, such an insert 71 may not be provided and each female thread may be defined by the lug aperture 85 itself. In yet further examples, such an insert 71 may not be provided and each female thread may be defined by a nut located either inside or outside of the lug aperture 85 and/or outside of the combustor liner lug, 80, 80'. Threaded engagement of the fastener 70, 70' and the components of the combustor assembly 160 facilitates easy assembly and disassembly and is therefore associated with an increase ease of manufacturing and maintenance of the combustor assembly 160.

In the example of FIGS. 4 to 7 (best shown in FIGS. 4, 5, and 7), a plurality of access holes 90, 90' are formed in the cowl 47. Each access hole 90, 90' is radially and circumferentially aligned with a corresponding head aperture 84 and a corresponding lug aperture 85. Further, each access hole 90, 90' is dimensioned so that the fastener 70, 70' which extends into (e.g., through) the corresponding apertures 84 is insertable and withdrawable into the apertures from the cold side of the head structure 44 through the access hole 90, 90'. This permits easier assembly and disassembly of the head structure 44 and the combustor liner 59, although the formation of the access holes 90, 90' in the cowl 47 may be associated with somewhat locally reduced aerodynamic performance of the combustor assembly 160 (e.g., due to the incitation of turbulence and/or pressure losses in the combustor annulus airflow).

FIG. 8 shows a detail cross-sectional view of a variant example combustor assembly 160 in a region corresponding to that indicated by C on FIG. 4. The example combustor assembly 160 shown in FIG. 8 is generally similar to the example combustor assembly 160 described above with respect to FIGS. 4 to 7, with like reference numerals indicating common or similar features. However, in the example combustor assembly 160 of FIG. 8, each fastener 70, 70' extends into the lug aperture 85 and the head aperture 84 from a direction which opposes the direction in which each fastener 70, 70' extends into the lug aperture 85 and the head aperture 84 in the example combustor assembly 160 of FIGS. 4 to 7. Accordingly, in the example of FIG. 8, each fastener 70, 70' is insertable into the apertures from the hot side of the head structure 44. Further, the male thread of each fastener 70, 70' engages a female thread which is defined by an insert 71 located inside the respective head aperture 84. In further examples, such an insert 71 may not be provided and each female thread may be defined by the head aperture 84 itself. In yet further examples, such an insert 71 may not be provided and each female thread may be defined by a nut located either inside or outside of the head aperture 84 and/or outside of the head structure 44.

Figure 9:
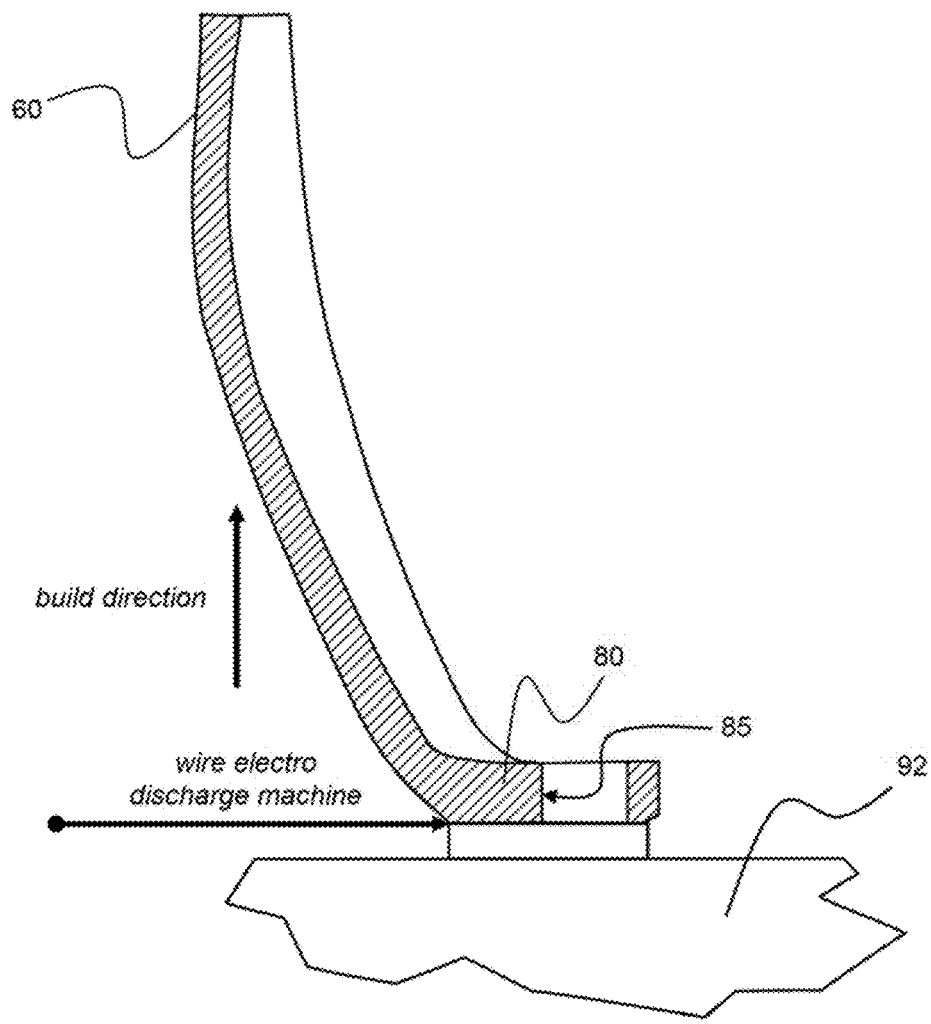
FIG. 9 is a schematic showing manufacturing of a combustor liner for the example combustor assembly of FIGS. 4 to 7 of the example combustor assembly of FIG. 8.

The combustor liner 59 (e.g., the combustor liner segment(s) 58, 60) may be manufactured using additive layer manufacture (ALM) as will be further described with respect to FIG. 9. For example, 'Laser Beam Powder Bed Fusion', 'Electron beam powder bed fusion', 'binder jetting' or 'nanoparticle jetting' ALM techniques may be employed. The lug aperture 85 and optionally the female thread may also be printed as part of the manufacturing of the combustor liner 59. Alternatively, the combustor liner 59 may be cast or manufactured using a CNC process. In both cases the lug aperture(s) 85 in the combustor liners 59 may be machined out.

The length direction of each fastener 70, 70' being parallel to the centreline 9' generally places the components of the combustor assembly 160 (e.g., each aperture 85, 84) in a more optimal orientation for manufacturing, especially if an ALM manufacturing process is used. In particular, such an orientation may reduce a requirement to machine the apertures 85, 84 and/or other components of the combustor assembly 160 after the ALM process is complete. More particularly, if a female thread is provided and formed within the aperture 85, 84, the aperture 85, 84 is placed in an improved orientation for a high-quality and repeatable surface finish of the female thread during the ALM process.

The presence of axial mating face(s) and/or axial sealing face(s) simplifies the manufacture of the combustor liner 59. For instance, the axial mating face(s) may be produced by a wire electro discharge machine process to remove the combustor liner segment 58, 60 from a build plate 92 as shown in FIG. 9. In this example, the combustor liner segment 58, 60 is manufactured using an ALM process. The combustor liner segment 58, 60 may be built up in a direction perpendicular and away from the surface of the build plate 92. Alternatively, it may be built at any suitable angle, however, this may require further machining of the combustor liner segment 58, 60 prior to incorporation within the combustor assembly 160. Using such a method allows for the height of the cut off from the build plate to be accurately determined. This allows for a greater degree of control and accuracy of the build of the combustor liner 59 structures. This has a further advantage of reducing the axial tolerance stack and therefore the fuel spray nozzle penetration into the combustion chamber 49'.

Various examples have been described, each of which feature various combinations of features. It will be appreciated by those skilled in the art that, except where clearly mutually exclusive, any of the features may be employed separately or in combination with any other features and the disclosure extends to and includes all combinations and sub-combinations of one or more features described herein.

It will also be appreciated that whilst the disclosure has been described with reference to aircraft and aircraft propulsion systems, the principles described herein could be used for many other applications. These include, but are not limited to, automotive, marine and land-based applications.

What is claimed is:

1. A combustor assembly for a gas turbine engine, the combustor assembly comprising a combustor liner, a combustor head, a cowl and a fastener, wherein:
    the combustor liner and the cowl define a cavity, wherein the combustor liner includes a radially outer annular wall and a radially inner annular wall defining the cavity therebetween, wherein the radially outer annular wall and the radially inner annular wall define a combustion chamber of the cavity on a side of the combustor head remote from the cowl;
    the combustor liner has an integral combustor liner lug that extends radially into the cavity from one or more of the radially outer annular wall or the radially inner annular wall of the combustor liner toward the other of the radially outer annular wall or radially inner annular wall; and
    the fastener extends axially into the integral combustor liner lug to fasten the combustor head to the combustor liner,
    wherein the cowl is arranged axially adjacent to the combustor head, wherein an aft surface of the combustor head and an aft surface of the cowl each abut a forward surface of the integral combustor liner lug.

2. The combustor assembly of claim 1, wherein the fastener extends through the integral combustor liner lug to fasten both the combustor head and the cowl to the integral combustor liner lug.

3. The combustor assembly of claim 1, wherein at least 70% of the volume of the fastener is located within the external profile defined by the cowl and the combustor liner.

4. The combustor assembly of claim 1, wherein
    the combustor assembly annularly extends around a centreline; and
    the fastener is elongate along a length direction parallel with the centreline.

5. The combustor assembly of claim 1, wherein
    the combustor assembly annularly extends around a centreline;
    the forward surface of the integral combustor liner lug lies on a mating plane; and
    a normal to the mating plane is substantially parallel to the centreline.

6. The combustor assembly of claim 1, wherein
    a head aperture is formed between the aft surfaces of the cowl and the combustor head;
    a lug aperture is formed in the forward surface of the integral combustor liner lug; and
    the fastener extends into both the head aperture and the lug aperture.

7. The combustor assembly of claim 6, wherein
the combustor head and the cowl together form a head structure;
the integral combustor liner lug extends into a corresponding recess defined by the head structure; and
the head aperture opens into the recess defined by the head structure.

8. The combustor assembly of claim 1, wherein
the combustor assembly annularly extends around a centreline; and
the cowl and the combustor liner each define a respective sealing face, and wherein the sealing face of the combustor liner abuts the sealing face of the cowl throughout the annular extent of the combustor assembly.

9. The combustor assembly of claim 8, wherein each sealing face lies on a sealing plane; and a normal to the sealing plane is substantially parallel with the centreline.

10. The combustor assembly of claim 1, wherein the fastener defines a male thread, and the combustor head and the cowl are fastened with respect to the combustor liner by means of the male thread engaging a female thread, and wherein
the female thread is defined by or located inside the integral combustor liner lug; or
the female thread is defined by a nut located outside of the integral combustor liner lug.

11. The combustor assembly of claim 10, wherein the fastener is configured to be withdrawn from the female thread through an access hole formed in the cowl.

12. The combustor assembly of claim 1, wherein the fastener is one of a plurality of fasteners, the integral combustor liner lug is one of a plurality of integral combustor liner lugs, and wherein:
each integral combustor liner lug extends into the cavity from the wall of the combustor liner; and
each fastener extends into a respective integral combustor liner lug to fasten the combustor head to the combustor liner.

13. A gas turbine engine comprising the combustor assembly of claim 1.

14. The combustor assembly of claim 1, wherein the cowl includes a radially outer portion arranged adjacent to the integral combustor liner lug extending from the radially outer annular wall of the combustor liner and a radially inner portion arranged adjacent to a second integral combustor liner lug extending from the radially inner annular wall of the combustor liner, and wherein a portion of the radially outer portion of the cowl directly abuts the integral combustor liner lug extending from the radially outer annular wall and wherein a portion of the radially inner portion of the cowl directly abuts the second integral combustor liner lug extending from the radially inner annular wall.

15. The combustor assembly of claim 14, wherein the combustor head includes an aperture, and wherein the radially outer portion and the radially inner portion of the cowl are arranged radially outwardly and radially inwardly of the aperture, respectively, and wherein a second fastener extends at least partially through the radially inner portion of the cowl and into the second integral combustor liner lug.

16. The combustor assembly of claim 1, further comprising:
a heat shield arranged on the side of the combustor head away from the cowl,
wherein the cowl includes a first portion that extends at least partially radially inwardly and the combustor head includes a second portion that extends at least partially radially outwardly, and wherein the integral combustor liner lug is located axially between the heat shield and the first and second portions.

17. The combustor assembly of claim 16, wherein the first and second portions of the cowl and the combustor head each define at least part of the aft surfaces of the cowl and combustor head which face the heat shield, wherein the heat shield defines a forward surface, and wherein a liner lug receiving space is defined between the aft surfaces of the first and second portions and the forward surface of the heat shield.

18. The combustor assembly of claim 17, wherein the fastener is located radially inwardly of a radially outer terminal end of the heat shield.

* * * * *